United States Patent
Nordström et al.

(10) Patent No.: US 8,768,258 B2
(45) Date of Patent: Jul. 1, 2014

(54) RECEIVER AND A METHOD FOR MOBILE COMMUNICATIONS

(75) Inventors: Fredrik Nordström, Lund (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 13/140,009

(22) PCT Filed: Dec. 14, 2009

(86) PCT No.: PCT/EP2009/067030
§ 371 (c)(1),
(2), (4) Date: Aug. 26, 2011

(87) PCT Pub. No.: WO2010/069903
PCT Pub. Date: Jun. 24, 2010

(65) Prior Publication Data
US 2011/0300819 A1    Dec. 8, 2011

Related U.S. Application Data

(60) Provisional application No. 61/145,688, filed on Jan. 19, 2009.

(30) Foreign Application Priority Data

Dec. 19, 2008    (EP) .................................... 08172437

(51) Int. Cl.
*H04B 1/00* (2006.01)
*H04B 1/16* (2006.01)
*H04J 3/06* (2006.01)

(52) U.S. Cl.
USPC ........ 455/63.1; 455/130; 455/200.1; 370/350

(58) Field of Classification Search
CPC ............ H04L 25/0204; H04L 25/0228; H04L 27/2665; H04L 27/2655; H04L 27/2657; H04B 7/2681; H04B 7/2684; H04W 56/00; H04W 56/0085
USPC ........................ 455/130, 200.1, 63.1; 370/350
See application file for complete search history.

(56) References Cited

U.S. PATENT DOCUMENTS 8,077,696 B2 * 12/2011 Izumi et al. .................... 370/350
2004/0179633 A1 * 9/2004 Shinoda et al. ............... 375/343

FOREIGN PATENT DOCUMENTS

EP    1276289 A2 *  1/2003    ............ H04L 27/26
EP    1 758 416 A1    2/2007

OTHER PUBLICATIONS

Article 94(3) EP Communication, dated Feb. 22, 2011, in connection with EP Application No. 08 172 437.9-1525.
PCT International Search Report, mailed Feb. 22, 2010, in connection with International Application No. PCT/EP2009/067030.

* cited by examiner

*Primary Examiner* — Wesley Kim
(74) *Attorney, Agent, or Firm* — Leffler Intellectual Property Law, PLLC

(57) ABSTRACT

In a method and a mobile communications receiver for processing signals from a first cell and a second cell a timing of the signal from the first cell and the second cell is obtained. A timing difference ($\delta$) between the timings of signals from the first and the second cell is determined and based on that a timing ($\kappa$) for a window for discrete Fourier transform, DFT, processing is adjusted. DFT processing of the signals using the timing ($\kappa$) of the DFT window is then performed.

2 Claims, 3 Drawing Sheets

RECEIVER AND A METHOD FOR MOBILE COMMUNICATIONS

CROSS REFERENCE TO RELATED APPLICATIONS

This application claims priority under 35 U.S.C. §119 to European Patent Application No. EP 08172437.9, filed on Dec. 19, 2008, which is hereby incorporated herein by reference in its entirety. This application also claims the benefit of U.S. Provisional Application No. 61/145,688, filed Jan. 19, 2009, which is hereby incorporated herein by reference in its entirety.

TECHNICAL FIELD

The present invention relates to a method and a receiver for processing a signal in a mobile communications system.

BACKGROUND

Recently, an increased demand for high data rates in mobile communications has been seen, and this trend will most likely continue in the coming years.

In order to meet this demand, new transmission techniques have been developed. In the forthcoming evolution of present mobile cellular standards like GSM and Wideband Code Division Multiple Access (WCDMA), Orthogonal Frequency Multiple Access (OFDM) will be used for transmission. OFDM promises higher data rates and a more efficient usage of limited bandwidth resources than the presently employed techniques.

Furthermore, in order to have a smooth migration from the existing cellular systems to a new high capacity and high data rate system in existing radio spectrum, such a new system has to be able to operate in a flexible bandwidth. A proposal for such a new flexible cellular system is 3G Long Term Evolution (3G LTE) that can be seen as an evolution of the 3G WCDMA standard. This system will use OFDM as multiple access technique (called OFDMA) in the downlink and will be able to operate on bandwidths ranging from 1.4 MHz to 20 MHz. Furthermore, data rates up to 100 Mb/s will be supported for the largest bandwidth, and such data rates will be possible to reach using MIMO (Multiple-Input-Multiple Output) schemes in the down-link.

In such a system, and in a situation where a mobile device is surrounded by a number of cells, problems relating to strong inter-cell interference (ICI) may occur. In order to optimize the throughput also in such a situation, the mobile device needs to implement methods for handling such inter-cell interference.

SUMMARY

A method of processing a signal in a mobile communications system is presented, wherein the inter-cell interference is mitigated in a receiver by adjusting the position of a window for discrete Fourier transform, DFT, processing based on a timing difference between a first cell and a second cell. In this way a possible joint channel estimate procedure and, in turn, the quality of the demodulated symbols are improved.

Specifically, according to embodiments of the invention, in a method, in a mobile communications receiver, of processing signals received from a first cell and a second cell, a timing of the signal from the first cell is obtained, and a timing of the signal from the second cell is obtained. A timing difference between the timings of the signals from the first and the second cell is determined and a timing for a window for DFT, processing is adjusted based on the timing difference. The signals are then DFT processed using the adjusted timing of the DFT window.

BRIEF DESCRIPTION OF THE DRAWINGS

The invention will be described more fully below with reference to the drawings, in which.

DETAILED DESCRIPTION

To facilitate an understanding of exemplifying embodiments of the invention, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Figure 1:
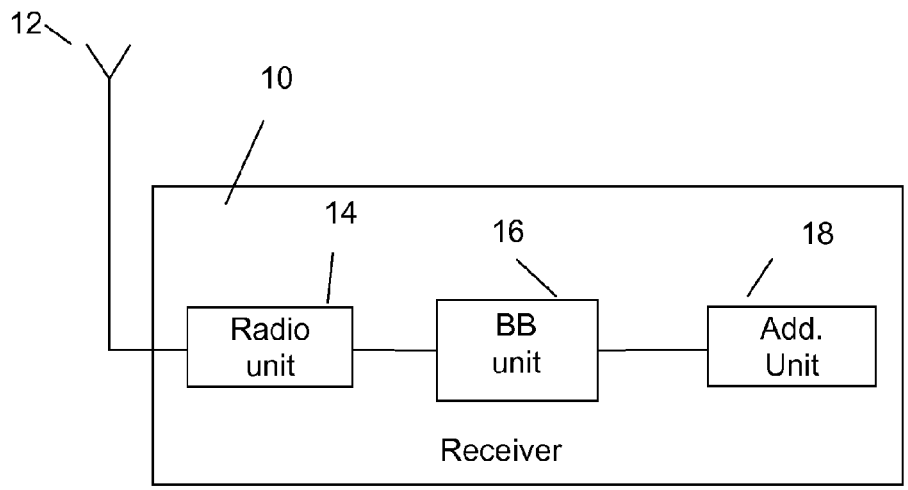
FIG. 1 is a schematic view of a receiver arrangement.

In FIG. 1 a receiver 10 is shown which receives signals via a receiver antenna 12. In the receiver 10, the signals received by the antenna are first processed by a radio front end (RF) unit 14, then by a baseband (BB) unit 16 and then possibly by some additional unit 18.

Figure 2:
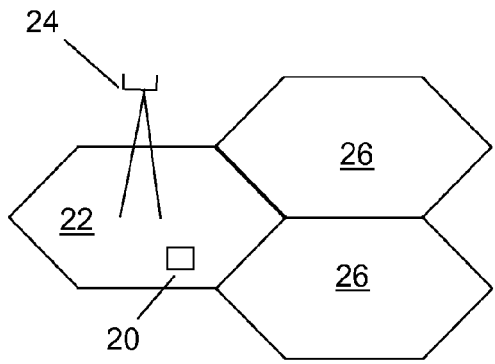
FIG. 2 shows part of a mobile communications system.

In FIG. 2, a mobile device 20 is connected to a first cell 22 (serving cell) of a radio base station 24 (also called Node B). The mobile device comprises a receiver 10 of FIG. 1. The mobile device is surrounded by a number of neighboring cells 26, associated with the same or another base station. In each cell, pilot symbols are transmitted to be used by mobile devices when obtaining channel estimates for that cell. However, the transmission of pilots from the neighboring cell(s) also causes interference when the mobile device 20 is obtaining channel estimates for the serving cell 22. To improve the situation, joint channel estimation may be used, where the receiver calculates channel estimates based on both the pilot symbols from the serving cell and for one or more neighboring cells. In this disclosure, only one neighboring cell is used in the exemplifying embodiments, but extension to more than one neighboring cell is straightforward.

Figure 3:
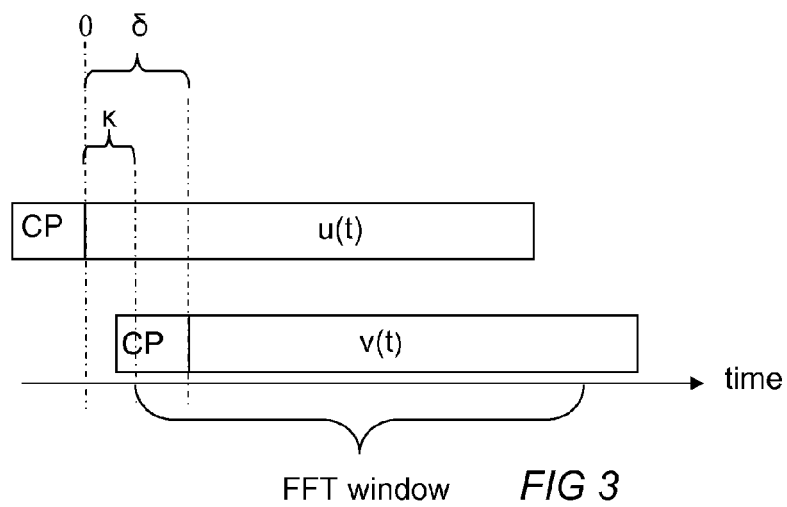
FIG. 3 illustrates received signals from two cells.

When a receiver calculates channel estimates in an OFDM based system, (or a system employing any access technique with DFT processing in the receiver, such as single-carrier frequency division multiple access, SC-FDMA) a timing κ for a window for DFT processing needs to be set. In FIG. 3, u(t) denotes the signal from the serving cell and v(t) denotes the signal from the neighboring cell. CP denotes the cyclic prefix part of the signals. The neighboring cell signal v(t) is delayed δ samples (δ may be negative or positive) compared to the serving cell signal u(t).

It may be noted that v(t) may also be a signal from a second serving cell. This may be the case when COordinated Multipoint transmission (COMP) is used.

A first option is to place the DFT window such that the start of the window is somewhere in the cyclic prefix of the serving cell signal u(t). This would be the timing used when obtaining channel estimates only for the serving cell.

However, when the mobile device calculates improved channel estimates using a joint channel estimation approach with a neighboring cell with typically other timing than the serving cell—in this case the timing difference is δ—relying placement of the DFT window solely on the serving cell may lead to unnecessary Inter Signal Interference (ISI), and, hence, lower quality channel estimates.

According to embodiments of the inventions, the timing difference δ between the serving cell signal u(t) and the neighboring cell signal v(t) is taken into account for determining the timing of the DFT window. This may be done in different ways. One option is to place the DFT window so that the start of the window is at δ/2.

Another option is to take the signal power of the serving cell and the neighboring cell into account and use the ratio between the power of the neighboring cell and the serving cell when determining the timing for the window, according to:

$$\kappa = \frac{\delta \cdot P_{NBC}}{P_{SC} + P_{NBC}}$$

wherein κ is the timing of the DFT window, $P_{NBC}$ is the signal power of the neighboring cell, and $P_{SC}$ is the signal power of the serving cell. The signal power of the serving cell and the neighboring cell may e.g. be obtained from Reference Signal Received Power (RSRP) measurements.

A weighting factor α, 0≤α≤1, possibly predetermined in simulations, may be included according to:

$$\kappa = \frac{\delta \cdot \alpha \cdot P_{NBC}}{\alpha \cdot P_{NBC} + P_{SC}}$$

Figure 4:
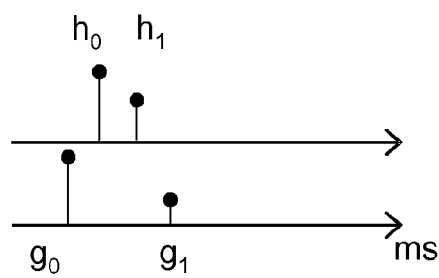
FIG. 4 shows power delay profiles for two received signals.

These two expressions both assume a single tap channel, but it would also be possible to extend the expressions to a multi-tap channel. In that case a power delay profile is determined for the signals, such as is illustrated in FIG. 4. The PDP comprises a number of channel taps $h_0$, $h_1$, $g_0$ and $g_1$. $h_0$ and $h_1$ are associated with the signal from the serving cell and $g_0$ and $g_1$ are associated with the signal from the neighboring cell. Each channel tap has a respective tap power, which is symbolized by the height of the taps in FIG. 4.

Figure 5:
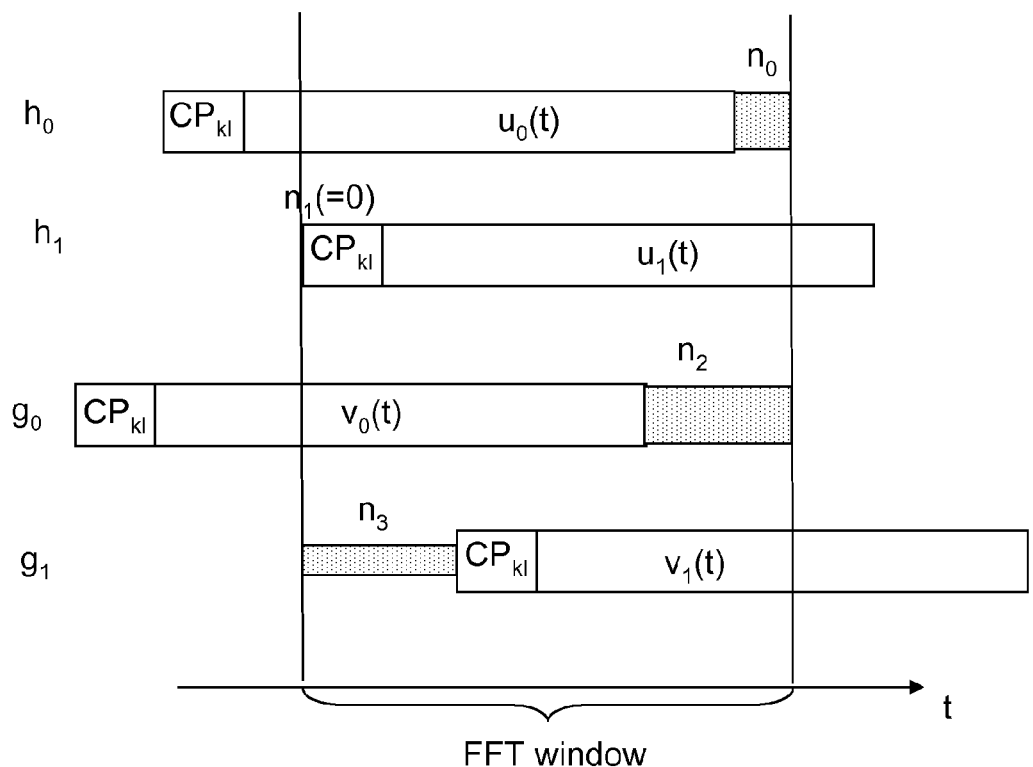
FIG. 5 illustrates received multipath signals from two cells.

In FIG. 5 the four different channel taps are illustrated as well, and here $n_0$, $n_1$, $n_2$ and $n_3$ are the number of samples in the DFT window that do not belong to the symbol that is being estimated.

A timing of the window can also be calculated by minimizing the sum of the tap powers for the channels taps $h_0$, $h_1$, $g_0$ and $g_1$, multiplied by the respective number of excess samples, $n_0$, $n_1$, $n_2$ and $n_3$, outside the symbol that is estimated. In FIG. 5 this would be equal to minimizing the dotted areas. The width of these areas symbolizes the number of samples which do not belong to the symbols that are being estimated. The height of each dotted area symbolizes the channel tap power. Thus, in the illustrated example we want to choose a timing for the window, i.e. a value of κ, that minimizes $$n_0 \cdot |h_0|^2 + n_1 \cdot |h_1|^2 + n_2 \cdot |g_0|^2 + n_3 \cdot |g_1|^2,$$

wherein the straight brackets means the absolute value.

Another way of expressing this would be by starting with the expression for the received signal after the DFT processing. Note that the following discussion, for the sake of simplicity, has been limited to a one tap channel, but, again, extension to a multitap channel is straightforward.

The signal after DFT can be described by:

$$y(t) = H(t)u(t) + G(t)v(t) + \tilde{H}(t)\tilde{u}(t) + \tilde{G}(t)\tilde{v}(t) + n(t)$$

Here H(t) is the channel for the serving cell and G(t) the channel for the neighboring cell. $\tilde{H}(t) \tilde{u}(t)$ and $\tilde{G}(t) \tilde{v}(t)$ model the ICI and the ISI, i.e. these two terms correspond to the samples which are inside the DFT window, but outside the symbol that is being estimated, this in turn corresponding to what is shown as the dotted areas in FIG. 5. n(t) is the background noise.

For the serving cell signal u(t) the number of samples $N_u$ being outside the symbol of interest but still in the DFT window is:

$$N_u = \begin{cases} -\kappa - N_{CP} - 1 & \kappa < -N_{CP} - 1 \\ 0 & \kappa >= -N_{CP} - 1 \text{ \& } \kappa <= 0 \\ \kappa & \kappa > 0 \end{cases}$$

For the neighboring cell signal v the number of samples $N_v$ that are outside the symbol of interest but still in the DFT window is:

$$N_v = \begin{cases} -\kappa + \delta - N_{CP} - 1 & \kappa - \delta < -N_{CP} - 1 \\ 0 & \kappa - \delta >= -N_{CP} \text{ \& } \kappa - \delta <= 0 \\ \kappa - \delta & \kappa - \delta > 0 \end{cases}$$

In these expressions, $N_{cp}$ is the number of samples in the cyclic prefix of the symbol. Finally, the variance of the disturbance $e_{tot}$ of the joint channel estimate due to ICI, ISI and background noise can be calculated as $$V[e_{tot}] = V(H(t)u(t)) \cdot 2\frac{N_u}{N_{DFT}} + V(G(t)v(t)) \cdot 2\frac{N_v}{N_{DFT}} + \sigma^2$$

Here $N_{DFT}$ is the number of samples in the DFT window, or in other words, the length of the DFT window. The variance of the background noise is $\sigma^2$. By minimizing this expression a timing κ for the DFT window can be found.

Figure 6A:
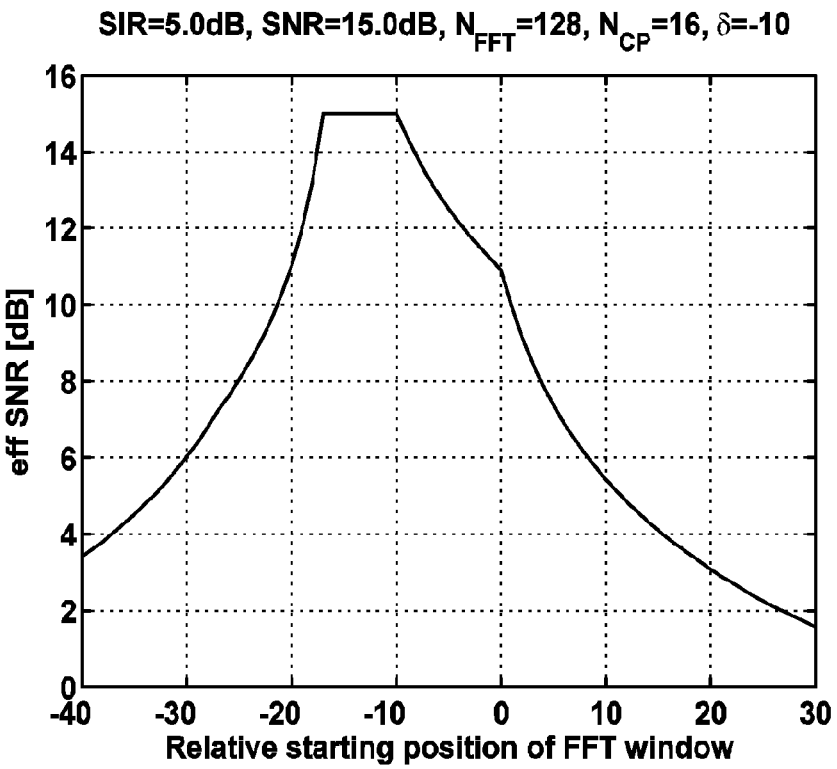
FIGS. 6A and 6B illustrates the effective Signal to Noise Ration (SNR) as a function of DFT window placement for two different timing differences.
Figure 6B:
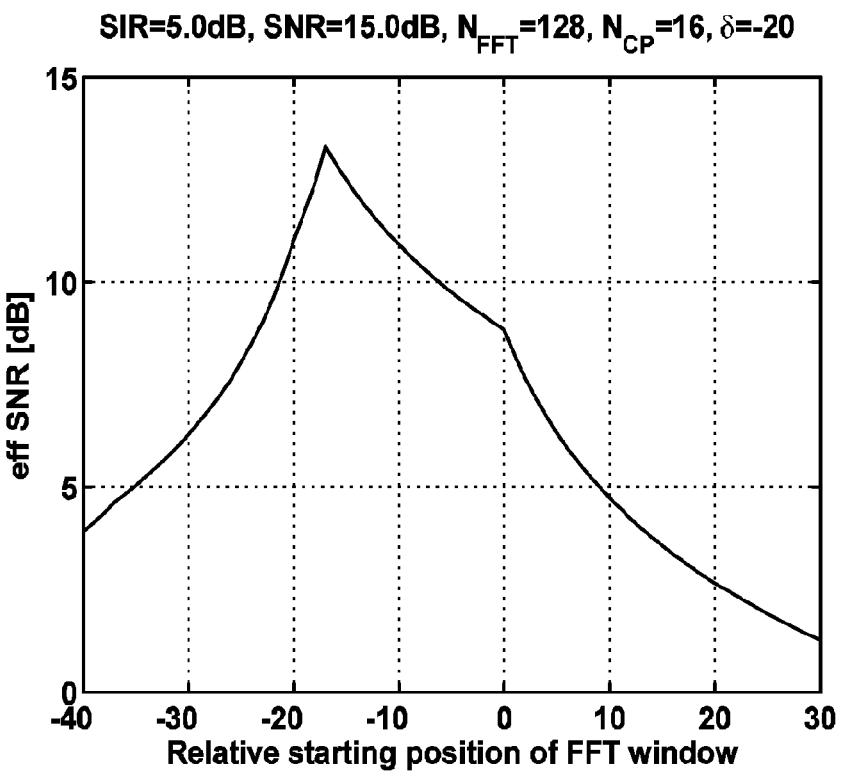

The effective SNR is equal to the signal power V(H(t)u(t)) divided by the variance of the disturbance $e_{tot}$. In FIGS. 6A and 6B the effective SNR is shown for different timings κ of the window for DFT processing. FIG. 6A shows the case where the timing difference δ between the serving cell and the neighboring cell is smaller than the cyclic prefix and FIG. 6B shows the case where δ is larger than the cyclic prefix. By using superposition it is possible to also calculate a position for the DFT window for other types of dispersive channels.

An alternative way of describing this is that the variance of the channel estimate is minimized for κ.

As a further option for determining how the timing of the DFT window should be adjusted, the variance of the error in the demodulated signal, can be minimized for κ.

The demodulated signal is equal to the DFT processed signal y(t) divided by an estimate of the channel received from a (joint) channel estimation unit. Since both y(t) and the channel estimate depend on κ and δ, the variance of the demodulated signal will also be dependent on κ and δ. A value of κ may be then be found by minimizing the variance of the demodulated signal for κ.

Figure 7:
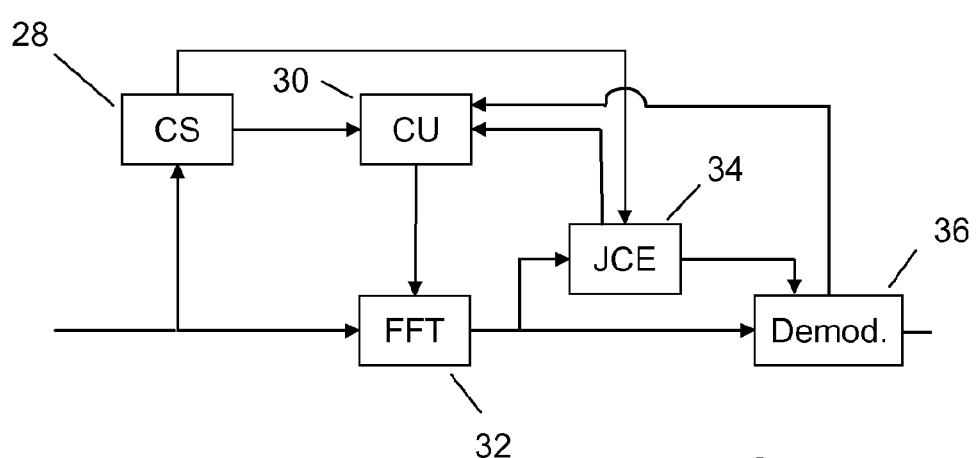
FIG. 7 shows parts of a receiver according to embodiments of the invention.

In FIG. 7 relevant parts of the baseband unit 16 of the receiver 10 are shown. A cell search unit 28 detects the neighboring cell and determines the timing and the power delay profile of the serving cell and the neighboring cell from the received signals. A control unit 30 determines the timing difference δ based on the timings of the serving cell and the neighboring cell, and then determines an adjustment of the timing κ for the window for DFT processing based on at least the timing difference δ according to any of the methods discussed above. A DFT unit 32 removes the cyclic prefix and places the window for DFT processing according to the determined timing κ and then DFT processes the received signal. In this context, it may be noted that the DFT unit often is implemented as a unit performing fast Fourier transform (FFT) processing.

A joint channel estimation unit 34 may then calculate a joint channel estimate using the DFT processed signal and information regarding pilot symbols and their frequency location conveyed through the cell id for the serving cell and the neighboring cell which is received from the cell search unit 28. A demodulation unit 36 then demodulates the signal.

In some embodiments of the invention, the joint channel estimation is only performed in case the control unit determines that the ratio of the signal power of the neighboring cell to the serving cell is above a predetermined threshold, e.g. if the neighboring cell is less than 10 dB weaker than the serving cell.

Additionally, the time alignment between the serving cell and the neighboring cell, i.e. δ, may be used to determine if joint channel estimation is to be performed. E.g. if δ is larger than 3-5 times the length of the cyclic prefix, channel estimation may be based only on the serving cell.

Figure 8:
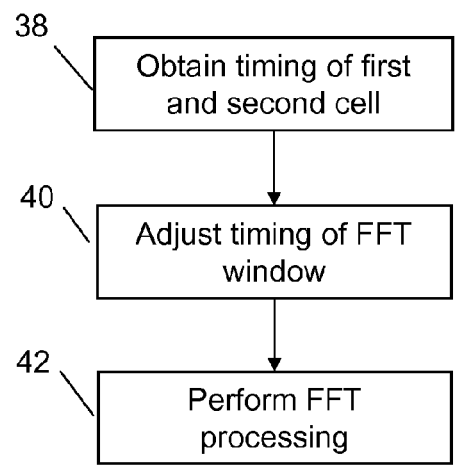
FIG. 8 shows a flow diagram of embodiments of the invention.

In FIG. 8, a method according to embodiments of the invention is illustrated. In step 38, a timing is obtained for a first and a second cell. In the above discussed example, the first cell is a serving cell and the second cell is a neighboring cell. In step 40 the timing κ of the window for DFT processing is determined based at least on the timing difference δ between the timings of the first cell and the second cell. In step 42 DFT processing is performed using the determined timing κ of the DFT window.

It may be noted that the above discussion is related to a single transmitter/single receiver antenna case, but extension to several transmitter and/or receiver antennas would be straightforward.

Although reference is here made to a receiver in a mobile device, such as a mobile terminal or a user equipment (UE), it should be noted that the methods and apparatus described may be used at any telecommunications receiver, i.e. in a mobile station or a base station, and the transmission may be uplink or downlink.

Thus, the embodiments disclosed herein are merely illustrative and should not be considered restrictive in any way. The scope of the invention is given by the appended claims, rather than the preceding description, and all variations which fall within the range of the claims are intended to be embraced therein.

The invention claimed is:

1. A method, in a mobile communications receiver, of processing signals from a first cell and a second cell, the method comprising:
    obtaining a timing of the signal from the first cell;
    obtaining a timing of the signal from the second cell;
    determining a timing difference between the timings of signals from the first and the second cell:
    adjusting a timing for a window for discrete Fourier transform, DFT, processing based on the timing difference;
    performing DFT processing of the signals using the timing of the DFT window;
    determining a ratio between a signal power of the second cell and a signal power of the first cell; and
    adjusting the timing of the window based on the ratio.

2. A mobile communications receiver, comprising:
    a cell search unit configured to obtain a timing of a signal from a first cell and a timing of signal from a second cell;
    a control unit configured to determine a timing difference between the timing of the signal from the first cell and the timing of the signal from the second cell and to adjust a timing for a window for discrete Fourier transform, DFT, processing based on the timing difference; and
    an FFT unit adapted to DFT process the signals using the timing of the DFT window,
    wherein the control unit is further configured to determine a ratio between a signal power of the second cell and a signal power of the first cell and to adjust the timing of the window based on the ratio.

* * * * *

UNITED STATES PATENT AND TRADEMARK OFFICE
CERTIFICATE OF CORRECTION

PATENT NO. : 8,768,258 B2
APPLICATION NO. : 13/140009
DATED : July 1, 2014
INVENTOR(S) : Nordstrom et al.

It is certified that error appears in the above-identified patent and that said Letters Patent is hereby corrected as shown below:

In the Specification

In Column 2, Line 15, delete "illustrates" and insert -- illustrate --, therefor.

In Column 3, Line 44, delete "$g_1.\ h_0$" and insert -- $g_1,\ h_0$ --, therefor.

In the Claims

In Column 6, Line 23, in Claim 1, delete "cell:" and insert -- cell; --, therefor.

Signed and Sealed this
Tenth Day of March, 2015

Michelle K. Lee
*Deputy Director of the United States Patent and Trademark Office*